United States Patent
Richards

(10) Patent No.: US 8,109,706 B2
(45) Date of Patent: Feb. 7, 2012

(54) COMPOSITE FASTENER, BELLY NUT, TIE SYSTEM AND/OR METHOD FOR REDUCING HEAT TRANSFER THROUGH A BUILDING ENVELOPE

(76) Inventor: Joseph P. Richards, Homer Glen, IL (US)

( * ) Notice: Subject to any disclaimer, the term of this patent is extended or adjusted under 35 U.S.C. 154(b) by 592 days.

(21) Appl. No.: 11/998,114

(22) Filed: Nov. 28, 2007

(65) Prior Publication Data

US 2009/0133357 A1    May 28, 2009

(51) Int. Cl.
  *F16B 25/02* (2006.01)
  *F16B 27/00* (2006.01)
  *F16B 23/00* (2006.01)
  *F16B 15/06* (2006.01)

(52) U.S. Cl. ............ 411/378; 411/387.1; 411/411; 411/424; 411/436; 411/421; 411/399; 411/900; 411/904; 408/227

(58) Field of Classification Search .......... 85/45, 53–55, 85/9 R, 1 JP, 1 C, 10 F, 47; 145/50 R, 50 B, 145/50 A; 411/378, 411, 903–904, 424, 411/436, 914, 386–387, 416–418, 900–901, 411/907–908, 421, 399; 428/67, 112, 105, 428/107, 397, 113, 117; 408/223–224, 227, 408/228
See application file for complete search history.

(56) References Cited

U.S. PATENT DOCUMENTS

| | | | | | |
|---|---|---|---|---|---|
| 2,353,009 | A | * | 7/1944 | Boyd | 82/150 |
| 2,949,054 | A | * | 8/1960 | White | 411/418 |
| 3,495,494 | A | * | 2/1970 | Scott | 411/411 |
| 4,041,834 | A | * | 8/1977 | Herkes et al. | 411/82.2 |
| 4,576,847 | A | * | 3/1986 | Tajima | 428/67 |
| 4,623,290 | A | * | 11/1986 | Kikuzawa et al. | 411/350 |
| 4,626,330 | A | * | 12/1986 | Farmer | 204/196.15 |
| 4,645,396 | A | * | 2/1987 | McCauley et al. | 411/387.2 |
| 4,909,690 | A | * | 3/1990 | Gapp et al. | 411/411 |
| 4,986,550 | A | * | 1/1991 | Segovia | 473/584 |
| 5,899,693 | A | * | 5/1999 | Himeno et al. | 433/119 |
| 5,915,901 | A | * | 6/1999 | Aasgaard | 411/29 |
| 6,212,841 | B1 | | 4/2001 | Plume | |
| 6,258,000 | B1 | * | 7/2001 | Liechty, II | 473/583 |
| 6,631,668 | B1 | * | 10/2003 | Wilson et al. | 89/1.14 |
| 6,719,638 | B2 | * | 4/2004 | Wethered | 473/49 |
| 6,860,691 | B2 | * | 3/2005 | Unsworth et al. | 411/412 |

(Continued)

OTHER PUBLICATIONS

"Setting the Standard of Excellence in the Masonry Industry," Product Catalog, Block-Lock, Ltd., Jan. 2005.

(Continued)

*Primary Examiner* — Jeanette E. Chapman
(74) *Attorney, Agent, or Firm* — Richards Patent Law P.C.

(57) ABSTRACT

A composite fastener, a belly nut, a tie system and/or a method reduce heat transfer through a building envelope. The composite fastener, the belly nut, the tie system and/or the method secure a wall to a backup structure. The composite fastener is constructed from a fiber reinforced polymer that has fibers embedded in a polymeric matrix. The composite fastener has a low thermal conductive value (k-value) and has non-corrosive properties. The belly nut has a fastening hole on a first side of the belly nut to attach the composite fastener to the belly nut. Further, the belly nut has a pathway to receive a leg of a pintle from a top surface of the belly nut to a bottom surface of the belly nut. The pathway is sized to allow for greater vertical adjustment eccentricity between the belly nut and the pintle without creating large horizontal deflections of the tie system.

11 Claims, 3 Drawing Sheets

U.S. PATENT DOCUMENTS

| | | | |
|---|---|---|---|
| 6,889,591 B2 * | 5/2005 | Sabates et al. | 89/1.14 |
| 2003/0131553 A1 | 7/2003 | Cyrson et al. | |
| 2005/0279042 A1 | 12/2005 | Bronner | |
| 2005/0279043 A1 | 12/2005 | Bronner | |
| 2007/0011964 A1 | 1/2007 | Smith | |

OTHER PUBLICATIONS

"Duro-O-Wall, Bonding the Masonry Industry Together for Over 60 Years," Product Catalog, Duro-O-Wall, 2003.

"Duro-O-Wall, Dayton Superior Building Strength," Masonry Products Catalog, Dayton Superior Corporation, 2007.

"Elco Construction Products," Product Catalog, Elco Construction Products, 2007.

"2007/2008 Product Catalog & Engineering Guide," Product Catalog, Heckmann Building Products, Inc., 2007.

"The Thermal Pos-I-Tie," http://www.heckmannbuildingprods.com/PPosTherm.htm, accessed Nov. 4, 2007, www.heckmannbuildingprods.com, United States.

"HB Hohmann & Barnard, Inc., Design & Fabrication of Stone Support and Masonry Anchoring Systems," Product Catalog, Hohmann & Barnard, Inc.

"Innovation in Masonry Construction," 2006 Products Catalog, Wire-Bond, 2006.

"ITWBuildex 2006/2007 Product Catalog," Product Catalog, ITWBuildex, 2006.

"Product Guide 2007, MKT Fastening, LLC" Product Catalog, MKT Fastening, LLC, 2007.

"2007-08 Powers Fasteners Buyers Guide," Product Catalog, Powers Fasteners, 2007.

"Red Head Anchoring Systems," Product Catalog, ITWRamset/Red Head, 2005.

* cited by examiner

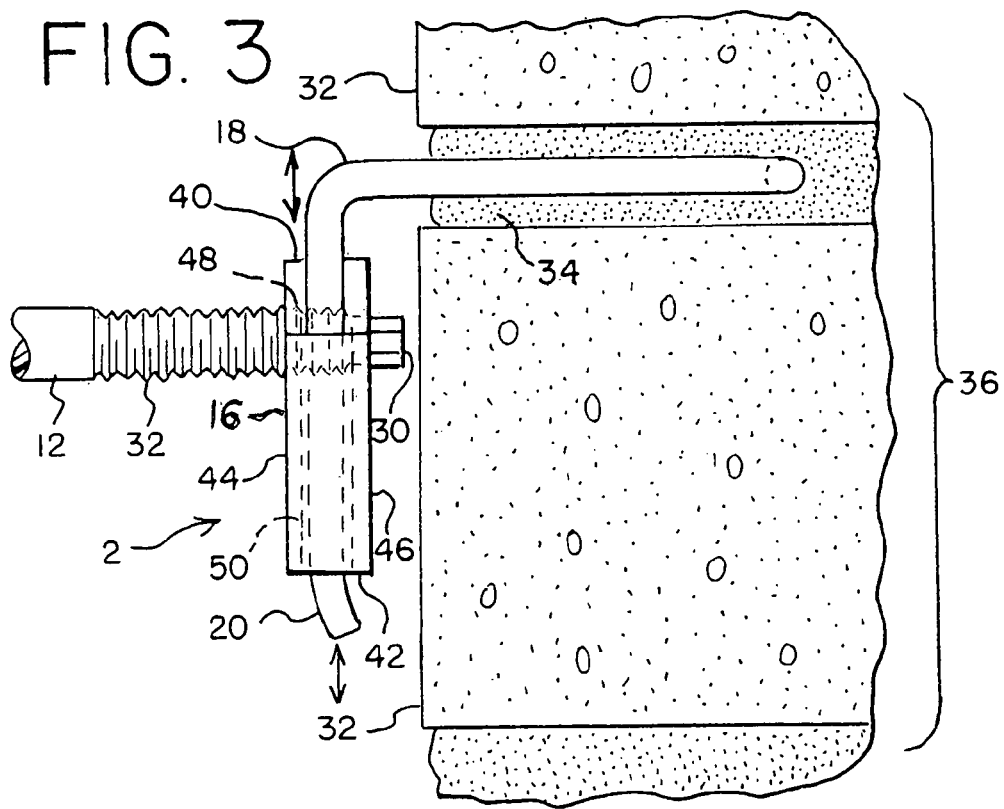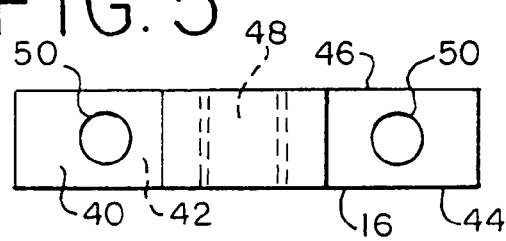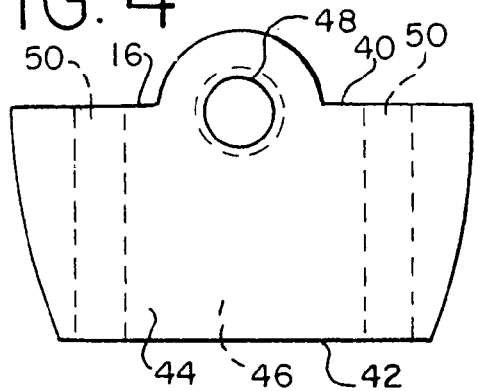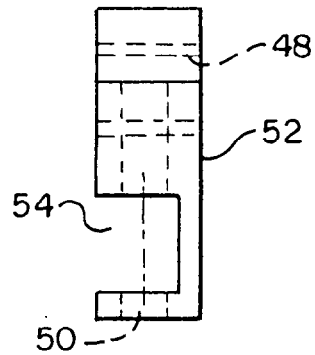

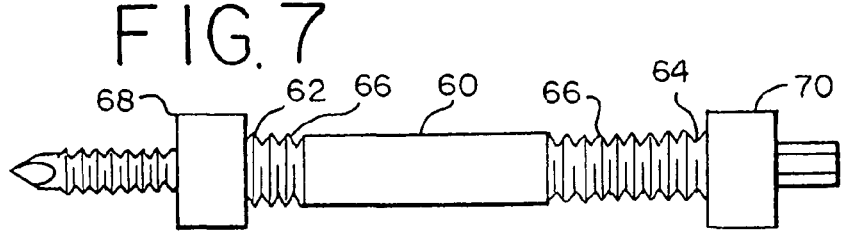
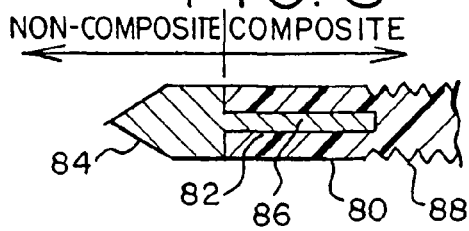
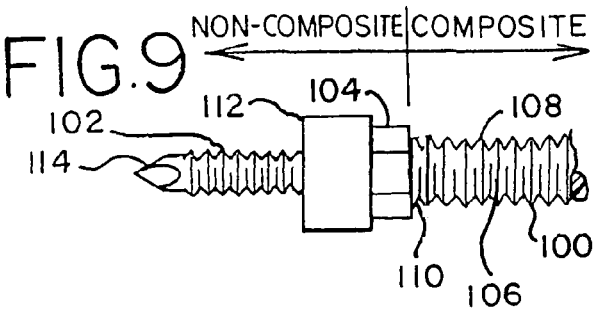
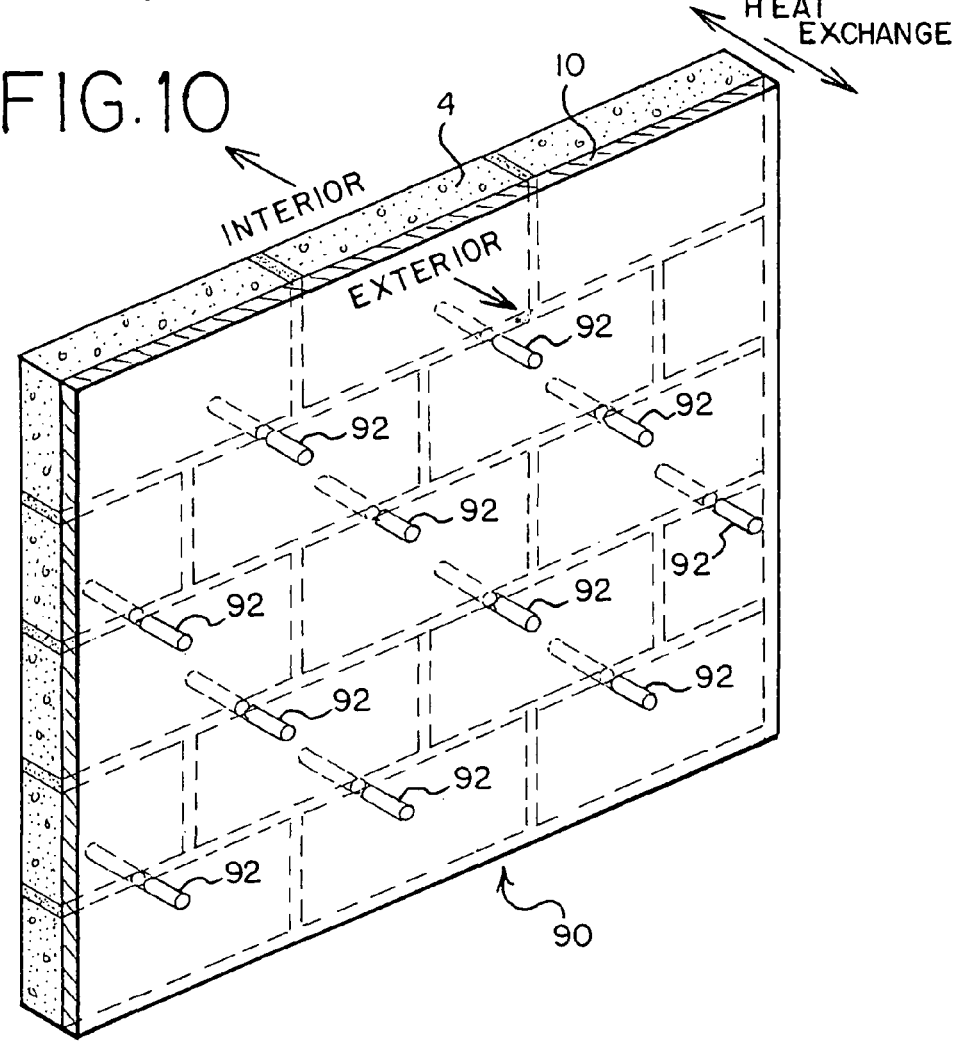

COMPOSITE FASTENER, BELLY NUT, TIE SYSTEM AND/OR METHOD FOR REDUCING HEAT TRANSFER THROUGH A BUILDING ENVELOPE

BACKGROUND OF THE INVENTION

The present invention generally relates to a composite fastener, a belly nut, a tie system and/or a method for reducing heat transfer through a building envelope. More specifically, the present invention relates to a composite fastener, a belly nut, a tie system and/or a method that may operate to secure a wall, such as, for example, a masonry wall, through insulation to a backup structure, such as, for example, a steel stud, a wood stud, a structural steel, a concrete, a block, another wall and/or the like. The composite fastener may be constructed from, for example, a fiber reinforced polymer that may have fibers embedded in a polymeric matrix. The composite fastener may have a low thermal conductive value (k-value) and may have non-corrosive properties. A first end of the composite fastener may extend through the insulation and may be attached to the backup structure. The belly nut may be used, for example, in masonry veneer anchor applications. The belly nut may have a fastening hole on a first side of the belly nut for attaching a second end of the composite fastener to the belly nut. Further, the belly nut may have a pathway to receive a leg of a pintle from a top surface of the belly nut to a bottom surface of the belly nut. The pathway may have a length that may allow for greater vertical adjustment eccentricity between the belly nut and the pintle without creating large horizontal deflections of the tie system.

It is generally known that thermal insulation, such as, for example, styrofoam board (k-value≈0.033 W/mK) and/or polyisocyanurate (k-value≈0.028 W/m K) is used to reduce conductive heat flow through a building envelope. The building envelope may be a separation between an interior environment and an exterior environment of a building. The building envelope is typically designed with a number of factors in mind, such as, for example, temperature control, moisture control, structural integrity and/or the like. The building envelope may be located, for example, between two or more external walls of a building. The building envelope may exist, for example, in and/or around masonry veneers, masonry cavity walls, roofs, exterior insulation and finish systems (EIFS), exteriors of metal buildings, and/or the like. Thermal insulation is typically situated and/or installed somewhere between the interior environment and the exterior environment of the building. Provided that the thermal insulation is continuous and/or uniform in the building envelope, thermal insulation may effectively lower heating and cooling costs while minimizing the potential of condensation on or within building components.

It is generally understood that building components should be designed to work together to create a continuous barrier to heat flow through the building envelope. Known components, systems and/or methods for securing an external wall to an internal wall or other like structure often have thermal insulation and/or moisture barriers situated between the external wall and the internal wall. However, known components, systems and/or methods have fastening devices that pass through the thermal insulation and/or the moisture barrier to fix the external wall to the internal wall. The known fastening devices are constructed from materials that have high thermal conductivities, such as, for example, stainless steel (k-value≈16 W/m K), carbon steal (k-value≈54 W/m K) and/or zamac alloy (which may be composed of ninety-two (92) percent zinc having a k-value≈116 W/m K). Further, the materials used to construct known fastening devices may be expensive and heavy.

The building envelope of a modern building may have hundreds and/or thousands of known fastening devices that may incidentally and/or passively act as thermal bridges and/or thermal shorts through the thermal insulation and/or the moisture barrier. In fact, the known fastening devices may be used to perforate the thermal insulation and/or the moisture barriers into the support structure. Known fastening devices significantly reduce the effectiveness of thermal insulation, moisture barriers and/or other insulation components. As a result, a building having known fastening devices may exhibit excessive heat loss or gain through a metallic material of the fastening device. Further, condensation related issues may arise as a result of the thermal bridges. For example, a dew point may migrate to a point closer to the interior environment of the building. Mold may grow and/or thrive in the building envelope. Moreover, thermal insulation, insulation components and/or fastening devices may exhibit accelerated corrosion due to the presence of moisture and/or due to the metallic properties of the fastening devices and/or the insulation components.

Further, in masonry veneer applications, known systems for securing an external wall to an internal wall have a fastening means for fastening a nut to the internal wall. The nut has a hole for receiving a leg of a pintle. The pintle is fixed to, for example, a mortar joint of the external wall. The pintle is designed to allow the leg of the pintle to slide vertically up and down in the hole to allow for vertical eccentricity in either wall and/or to allow fitting of the pintle and the belly nut when the pintle and the fastening means may not be situated on a same plane. The known systems prevent movement of the external wall in directions perpendicular to the internal wall. However, the hole of the nut may be too shallow; therefore, when large vertical eccentricities exist, deflection of the wall often results because the leg of the pintle is allowed to rotate about the hole towards and/or away from the internal wall.

A need, therefore, exists for a composite fastener, a belly nut, a tie system and/or a method for reducing heat transfer through a building envelope. Additionally, a need exists for a composite fastener, a belly nut, a tie system and/or a method that may operate to secure a wall, such as, for example, a masonry wall, through insulation to a backup structure, such as, for example, a steel stud, a wood stud, a structural steel, a concrete, a block, another wall and/or the like. Further, a need exists for a composite fastener that may be constructed from, for example, a fiber reinforced polymer that may have fibers embedded in a polymeric matrix. Still further, a need exists for a composite fastener that may have a low thermal conductive value (k-value) and may have non-corrosive properties. Still further, a need exists for a composite fastener that may reduce and/or eliminate thermal bridging through the building envelope via the composite fastener. Still further, a need exists for a composite fastener that may reduce and/or eliminate condensation and/or accumulation of moisture within and/or near the building envelope. Still further, a need exists for a belly nut that may have a pathway to receive a leg of a pintle having a length of the pathway to allow for greater vertical eccentricities while reducing horizontal deflections of the pintle.

SUMMARY OF THE INVENTION

The present invention generally relates to a composite fastener, a belly nut, a tie system and/or a method for reducing heat transfer through a building envelope. More specifically, the present invention relates to a composite fastener, a belly nut, a tie system and/or a method that may operate to secure a wall, such as, for example, a masonry wall, through insulation to a backup structure, such as, for example, a steel stud, a wood stud, a structural steel, a concrete, a block, another wall and/or the like. The composite fastener may be constructed from, for example, a fiber reinforced polymer that may have fibers embedded in a polymeric matrix. The composite fastener may be manufactured using a process, such as, for example, open molding and/or closed molding. The composite fastener may have a tip at a first end of the fastener that may be used to cut into and/or drill into the backup structure to secure the composite fastener to the backup structure. The composite fastener may have threads between the first end and a second end of the fastener. Further, the fastener may have a driver head at the second end for receiving a tool to drive the fastener into the backup structure. The composite fastener may have a low thermal conductive value (k-value) and may have non-corrosive properties.

The belly nut may have a fastening hole on a first side of the belly nut for attaching the threads of the second end of the composite fastener to the belly nut. Further, the belly nut may have a pathway to receive a leg of a pintle from a top surface of the belly nut to a bottom surface of the belly nut. The pathway may have a length that may allow for greater vertical adjustment eccentricity between the belly nut and the pintle without creating large horizontal deflections of the tie system.

To this end, in an embodiment of the present invention, a fastener for reducing heat transfer through a building envelope is provided. The fastener has a shaft having a length defined between a first end and a second end positioned generally opposite to the first end wherein the shaft is generically cylindrical about a central axis wherein the shaft is constructed from a composite material wherein the composite material is a fiber reinforced polymer wherein the shaft has threads integrally formed with the shaft between the first end and the second end. Further, the fastener has a tip that is removably attached to the first end of the shaft. Moreover, the fastener has a driver head in communication with the tip and the shaft to rotate the tip and the shaft about the central axis.

In an embodiment, the fastener has a tapped hole at the first end of the shaft wherein the tapped hole is threaded and receives the tip.

In an embodiment, the driver head is integrally formed with the tip wherein the driver head receives the threads of the shaft to attach the shaft to the driver head and the tip.

In an embodiment, the fiber reinforced polymer is a fiberglass.

In an embodiment, the composite material has an k-value less than one (1.0) W/m K.

In an embodiment, the fastener the driver head is attached to the second end of the shaft.

In an embodiment, the tip is attached to the threads of the shaft at the first end of the shaft.

In an embodiment, the tip is constructed from one of stainless steel, carbon steel and zamac alloy.

In an embodiment, the fastener has a cutting means on the tip.

In an embodiment, the fastener has a nut attached to the threads at the second end of the shaft.

In another embodiment, a tie system for reducing heat transfer through a building envelope is provided wherein the building envelope has a backup structure, a thermal insulation and a wall wherein the wall is situated in a position generally parallel to the backup structure wherein the thermal insulation is situated between the backup structure and the wall. The tie system has a composite fastener to penetrate the thermal insulation of the building envelope into the backup structure wherein the composite fastener attaches the backup structure through the insulation to the wall wherein the composite fastener is constructed from a composite material wherein the composite material is a fiber reinforced polymer. Further, the tie system has a nut to connect the composite fastener to the wall wherein the nut has a width defined between a first side and a second side positioned generally opposite to the first side wherein the nut has a height defined between a top side and a bottom side positioned generally opposite to the top side wherein the nut has a tapped hole to receive the fastener between the first side and the second side wherein the nut has a first pathway between the top side and the bottom side wherein the height is greater than the width. Moreover, the tie system has a pintle that is generally L-shaped wherein the pintle has a leg wherein the nut receives the leg through the pathway from the top side to the bottom side of the nut wherein the pintle is attached to the wall.

In an embodiment, the tie system has a washer situated on the fastener between the nut and the thermal insulation.

In an embodiment, the tie system has a second pathway between the top side and the bottom side of the nut.

In an embodiment, the nut is constructed from one of stainless steel, carbon steel and zamac alloy.

In an embodiment, the nut is constructed from the composite material.

In an embodiment, the tie system has an opening between the first side and the second side and between the top side and the bottom side of the nut wherein the opening reduces an amount of material required to manufacture the nut.

In another embodiment, a method for reducing heat transfer through a building envelope having a first structure, a second structure and insulation wherein the insulation has a width defined between a first side and second side situated in a position generally parallel to the first side wherein the width of the insulation is situated between the first structure and the second structure is provided. The method has the step of providing a plurality of fasteners wherein the plurality of fasteners are generally cylindrical in shape wherein the plurality of fasteners have a length defined between a first end and a second end situated generally opposite to the first end wherein the plurality of fasteners are constructed from a composite material between the first end and the second end wherein the composite material is a fiber reinforced polymer. Further, the method has the step of perforating the insulation to create a plurality of holes from the first side to the second side of the insulation. Still further, the method has the step of situating the composite material of the plurality of fasteners in the plurality of holes across the width of the insulation. Still further, the method has the step of connecting the first end of the plurality of fasteners to the first structure. Moreover, the method has the step of connecting the second end of the plurality of fasteners to the second structure.

In an embodiment, the method has the step of driving the first end of the plurality of fasteners into the first structure.

In an embodiment, the method has the step of attaching the second end of the plurality of fasteners to a masonry tie that is connected to the second structure.

In an embodiment, the fiber reinforced polymer is a fiberglass.

It is, therefore, an advantage of the present invention to provide a composite fastener, a belly nut, a tie system and/or a method for reducing heat transfer through a building envelope.

Another advantage of the present invention is to provide a composite fastener, a belly nut, a tie system and/or a method for reducing heat transfer through a building envelope that may operate to secure a wall, such as, for example, a masonry wall, through insulation to a backup structure, such as, for example, a steel stud, a wood stud, a structural steel, a concrete, a block, another wall and/or the like.

And, another advantage of the present invention is to provide a composite fastener, a belly nut, a tie system and/or a method for reducing heat transfer through a building envelope wherein the composite fastener may be constructed from, for example, a fiber reinforced polymer that may have fibers embedded in a polymeric matrix.

Yet another advantage of the present invention is to provide a composite fastener, a belly nut, a tie system and/or a method for reducing heat transfer through a building envelope wherein the composite fastener may have a low thermal conductive value (k-value).

A further advantage of the present invention is to provide a composite fastener, a belly nut, a tie system and/or a method for reducing heat transfer through a building envelope wherein the composite fastener may have non-corrosive properties.

Moreover, an advantage of the present invention is to provide a composite fastener, a belly nut, a tie system and/or a method for reducing heat transfer through a building envelope wherein a first end of the composite fastener may extend through the insulation and may be attached to the backup structure.

And, another advantage of the present invention is to provide a composite fastener, a belly nut, a tie system and/or a method for reducing heat transfer through a building envelope wherein the belly nut may have a pathway that may have a length that may allow for greater vertical adjustment eccentricity between the belly nut and the pintle without creating large horizontal deflections of the tie system.

Yet another advantage of the present invention is to provide a composite fastener, a belly nut, a tie system and/or a method for reducing heat transfer through a building envelope that may reduce and/or eliminate thermal bridging through the building envelope via the composite fastener.

Another advantage of the present invention is to provide a composite fastener, a belly nut, a tie system and/or a method for reducing heat transfer through a building envelope that may reduce and/or eliminate condensation and/or accumulation of moisture within and/or near the building envelope.

Yet another advantage of the present invention is to provide a composite fastener, a belly nut, a tie system and/or a method for reducing heat transfer through a building envelope wherein the composite fastener may have physical properties suitable to replace known metallic fasteners.

A still further advantage of the present invention is to provide a composite fastener, a belly nut, a tie system and/or a method for reducing heat transfer through a building envelope wherein the composite tie may be constructed from a more lightweight material than materials used to construct known fasteners.

Moreover, an advantage of the present invention is to provide a composite fastener, a belly nut, a tie system and/or a method for reducing heat transfer through a building envelope wherein the composite tie may be manufactured and/or machined to a variety of configurations required for use in applications, such as, for example, masonry veneer walls, masonry cavity walls, roofing, waterproofing, exterior insulation and finish systems (EIFS), metal buildings and/or the like.

And, another advantage of the present invention is to provide a composite fastener, a belly nut, a tie system and/or a method for reducing heat transfer through a building envelope that may be used to construct more efficient, environmentally friendly and/or "green" buildings.

Yet another advantage of the present invention is to provide a composite fastener, a belly nut, a tie system and/or a method for reducing heat transfer through a building envelope that may reduce the growth, reproduction and/or propagation of mold in and/or around the building envelope.

Moreover, an advantage of the present invention is to provide a composite fastener, a belly nut, a tie system and/or a method for reducing heat transfer through a building envelope that when used in conjunction with thermal insulation provide a continuous barrier to heat flow through the building envelope.

And, another advantage of the present invention is to provide a composite fastener, a belly nut, a tie system and/or a method for reducing heat transfer through a building envelope that may increase the effectiveness of thermal insulation, insulation components, moisture barriers and/or the like used in modern buildings.

Yet another advantage of the present invention is to provide a composite fastener, a belly nut, a tie system and/or a method for reducing heat transfer through a building envelope that may meet strict standards of local, state and/or national fire, safety and/or building codes.

Moreover, an advantage of the present invention is to provide a composite fastener, a belly nut, a tie system and/or a method for reducing heat transfer through a building envelope wherein the composite fastener may be cost effective to manufacture, to ship and/or to distribute.

Additional features and advantages of the present invention are described in, and will be apparent from, the detailed description of the presently preferred embodiments and from the drawings.

BRIEF DESCRIPTION OF THE DRAWINGS

FIG. 3 illustrates a side view of a tie system in an embodiment of the present invention.

FIG. 4 illustrates a side view of a belly nut in an embodiment of the present invention.

FIG. 5 illustrates a top view of a belly nut in an embodiment of the present invention.

FIG. 6 illustrates a side view of a belly nut in an embodiment of the present invention.

FIG. 7 illustrates a side view of a composite fastener in an embodiment of the present invention.

FIG. 8 illustrates a cross-sectional view of a composite fastener in an embodiment of the present invention.

FIG. 9 illustrates a side view of a composite fastener in an embodiment of the present invention.

FIG. 10 illustrates a perspective view of a plurality of composite fasteners attached through insulation to a backup structure in an embodiment of the present invention.

DETAILED DESCRIPTION OF THE PRESENTLY PREFERRED EMBODIMENTS

The present invention generally relates to a composite fastener, a belly nut, a tie system and/or a method for reducing heat transfer through a building envelope. More specifically, the present invention relates to a composite fastener, a belly nut, a tie system and/or a method that may operate to secure a wall, such as, for example, a masonry wall, through insulation to a backup structure, such as, for example, a steel stud, a wood stud, a structural steel, a concrete, a block, another wall and/or the like. The composite fastener may have a low thermal conductive value (k-value) and may have non-corrosive properties. The belly nut may be used, for example, in masonry veneer anchor and masonry cavity wall applications.

Figure 1:
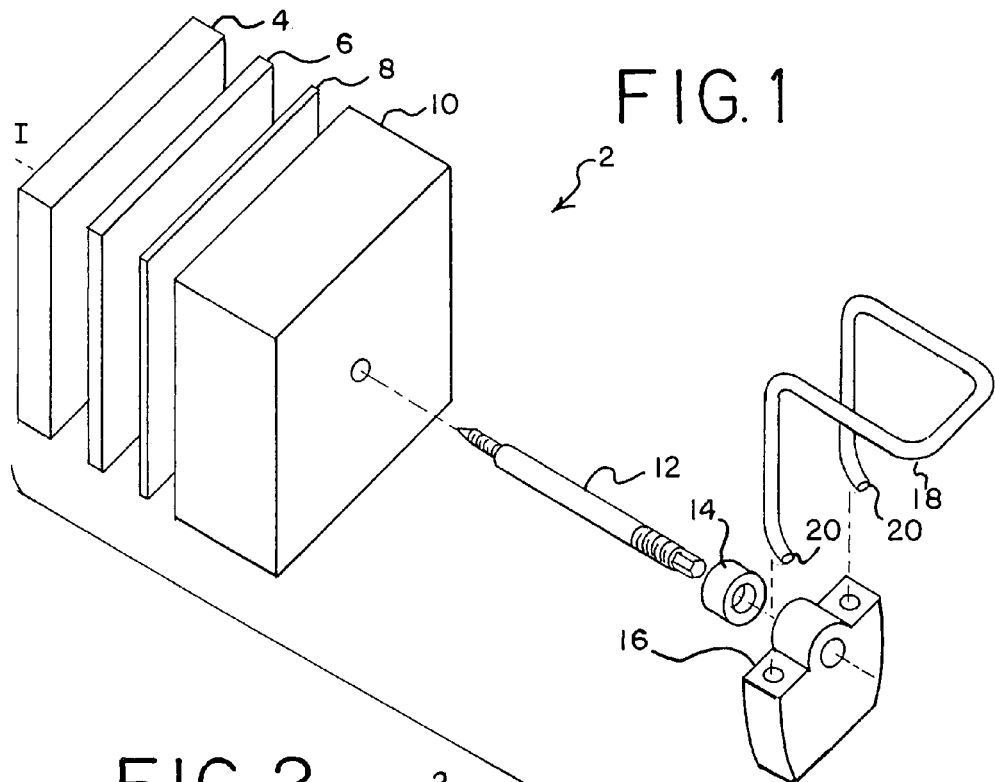
FIG. 1 illustrates an exploded perspective view of a tie system in an embodiment of the present invention.
Figure 2:
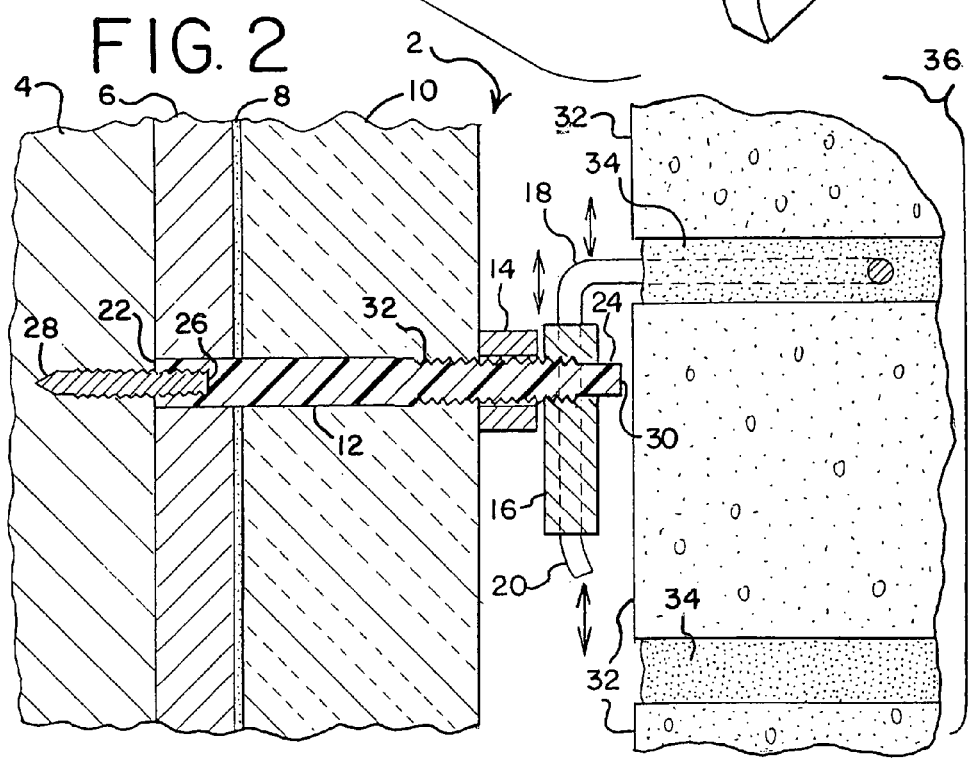
FIG. 2 illustrates a cross-sectional view taken generally along line I-I of FIG. 1 of a tie system in an embodiment of the present invention.

Referring now to the drawings wherein like numerals refer to like parts, FIGS. 1-3 illustrate a tie system 2 in embodiments of the present invention. The tie system 2 may have a backup structure 4, exterior sheeting 6, a barrier 8, insulation 10, a composite fastener 12, a washer 14, a belly nut 16 and/or a pintle 18. In an embodiment, the backup structure 4 may be a steel stud, a wood stud, a structural steel, a concrete, a brick, a cinder block, a mortar joint, a wall and/or the like. In an embodiment, the exterior sheeting 6 may be a protective coating, a plastic sheet, an insulating material, a fire retardant material and/or like material that may protect the backup structure. In an embodiment, the barrier 8 may be any material used to prevent transmission of air and/or water from one side of the barrier 8 to another side of the barrier 8. In an embodiment, the insulation 10 may be any material used to insulate the backup structure 4, such as, for example, a spray-in insulation, a sheet insulation, a fiberglass insulation, a styrofoam insulation, a polyisocyanurate insulation and/or the like. The backup structure 4, the exterior sheeting 6, the barrier 8 and/or the insulation 10 may be have varying sizes, amounts and/or thicknesses depending on a building application. The present invention should not be deemed as limited to a specific embodiment of the backup structure 4, the exterior sheeting 6, the barrier 8 and/or the insulation 10. It should be understood that the backup structure 4, the exterior sheeting 6, the barrier 8 and/or the insulation 10 may be any backup structure, exterior sheeting, barrier and/or insulation, respectively, as known to one having ordinary skill in the art.

As shown in FIG. 2, the composite fastener 12 may be inserted through the insulation 10, the barrier 8, and/or the external sheeting 6 and attached to the backup structure 4. The washer 14 may be situated on the composite fastener 12 between the insulation 10 and the belly nut 16. The washer 14 may prevent a passage of moisture and/or air through the insulation and/or towards the backup structure 4. In an embodiment, the washer 14 may be situated between the backup structure 4 and the insulation 10. In an embodiment, the washer 14 may be a gasket situated between a surface of the fastener 12 and the backup structure 4. The belly nut 16 may be attached to the composite fastener 12 at a position generally opposite to the backup structure 4 and/or adjacent to the washer 14. The pintle 18 may have a leg 20 that may be inserted into the belly nut 16. The pintle 18 may be secured to a wall 36 at, for example, a mortar joint 34 between bricks 32 of the wall 36. The wall 36 may be any structure that may be secured to the backup structure 4, such as, for example, a concrete surface, a mortar joint, a brick wall, a block wall, a masonry veneer wall, a masonry cavity wall, a roofing material and/or the like. As a result, the tie system 2 may secure the wall 36 to the backup structure 4 by the composite fastener 12 and may prevent movement of the wall in a direction perpendicular to a plane defined by the backup structure 4. The present invention should not be deemed as limited to a specific embodiment of the washer 14, the pintle 18 and/or the wall 36. It should be understood that the washer 14, the pintle 18 and/or the wall may be any washer, means for attaching the wall to the fastener and/or backup structure 4, respectively, as known to one having ordinary skill in the art.

FIGS. 1, 3 and 7-10 generally illustrate a composite fastener 12, 60, 80, 92, 100 in embodiments of the present invention. The composite fastener 12, 60, 80, 92, 100 may be generally cylindrical in shape. The composite fastener 12, 60, 80, 92, 100 may be constructed from a composite material, such as, for example, a fiber reinforced polymer. In an embodiment, the composite fastener 12, 60, 80, 92, 100 may be a fiberglass. The fiber reinforced polymer may have fibers, such as, for example, glass fibers, carbon fibers and/or the like that may be embedded in a polymeric matrix and/or a resin, such as, for example, an epoxy resin, a phenolic resin and/or the like. A primary function of the fibers may be able to resist a load exerted along a length of the fibers to provide a uniaxial strength in a first direction. The fibers may be oriented to provide resistive properties in a direction of loads that may be placed on the composite fastener 12, 60, 80, 92, 100. A primary function of the polymeric matrix may be to transfer stresses between the fibers, therefore, acting as a glue to hold the fibers together. Further, the polymeric matrix may protect the fibers from mechanical and/or environmental damage. Additionally, fillers and additives may be added to the polymeric matrix to improve performance of the fiber reinforced polymer. The present invention should not be deemed as limited to a specific embodiment of the composite material. In an embodiment, the composite material may have a k-value that may be less than one (1.0) W/m K. It should be understood that the composite material may be any material that may have a k-value that may be lower than metallic materials, such as, for example, carbon steel, stainless steal and/or zamac alloy, as known to one having ordinary skill in the art. Further, it should be understood that the composite material may be any material that may have non-corrosive properties as known to one having ordinary skill in the art.

Further, the composite fastener 12, 60, 80, 92, 100 may be manufactured by a process, such as, for example, an open molding process, a closed molding process and/or the like. In the open molding process, the composite fastener 12, 60, 80, 92, 100 may be constructed using, for example, a hand lay up process, a chopped laminate process, a filament winding process and/or the like. The hand lay up process may have a manual application of the resin and/or a mechanical application of the resin. The chopped laminate process may have an atomized spray up process and/or a non-atomized spray up process.

In the closed molding process, the composite fastener 12, 60, 80, 92, 100 may be constructed using, for example, a compression molding technique, a pultrusion technique, a reinforced reaction injection molding technique (RRIM), a resin transfer molding technique (RTM), a vacuum bag molding technique, a vacuum infusion processing technique, a centrifugal casting technique, a continuous lamination technique and/or the like. The compression molding technique may have a sheet molding compound (SMC), a bulk molding compound (BMC), a thick molding compound (TMC), a low pressure molding compound (LPMC), a wet layup compression molding compound and/or the like. The vacuum bag molding technique may have a wet layup process and/or prepreg process. Once molded, the composite fastener 12, 60, 80, 92, 100 may require a curing process, a painting process, a machining process and/or the like before becoming a finalized product. Further, additional parts may be added to the composite fastener 12, 60, 80, 92, 100 during and/or after molding to complete the finished product. The present invention should not be deemed as limited to a specific embodiment of the process used to construct and/or to form the composite fastener 12, 60, 80, 92, 100. It should be understood that the process used to construct and/or to form the composite fastener 12, 60, 80, 92, 100 may be any process and/or technique as known to one having ordinary skill in the art, such as, for example composites manufacturing processes known by the American Composites Manufacturers Association (ACMA) and/or like standards organization.

As shown in FIG. 2, the composite fastener 12 may be generally cylindrical in shape. The composite fastener 12 may have a first end 22 and a second end 24 that may be situated generally opposite to the first end 22. The composite fastener 12 may be constructed from the composite material between the first end 22 and the second end 22. In an embodiment, the composite fastener 12 may have threads 32 that may be integrally formed with the composite fastener 12 between the first end 22 and the second end 24. The threads 32 may be formed as an integral feature of the composite fastener 12 during the open molding and/or the closed molding process.

In an embodiment, the first end 22 may have, for example, a tapped hole 26 that may receive a tip 28. The tip 28 may be threaded and may be received by the tapped hole 26 by rotating an end of the tip 28 into the tapped hole 26. While the composite fastener 12 may be constructed entirely from the composite material, the tip 28 may be constructed from any material, such as, for example, carbon steel, stainless steel, zamac alloy, the composite material and/or like material. The tip 28 may be configured in a shape that may allow the tip, while attached to the composite fastener 12, to be drilled into the insulation 10, the barrier 8, the sheeting material 6 and/or the backup structure 4. The tip 28 may be, for example, a cutting means and/or a drilling means for securing the composite fastener 12 to the backup structure 4. The tip 28 may have a tensile strength to effectively transfer the uniaxial load to the composite fastener 12. The present invention should not be deemed as limited to a specific embodiment of the tip 28. It should be understood that the tip 28 may be any attachment means for modifying a fastener as known to one having ordinary skill in the art.

In an embodiment, the threads 32 that may be located at the second end 24 of the composite fastener 12 may receive a driver head 30. While the composite fastener 12 may be constructed entirely from the composite material, the driver head 30 may be constructed from any material, such as for example, a carbon steel, a stainless steel, a zinc, the composite material and/or like material. The driver head 30 may be configured in a shape that may allow a tool, that may be shaped to fit the driver head 30, to drive the composite fastener 12 by rotating the composite fastener 12 and, therefore, the tip 28 into the backup structure 4. The present invention should not be deemed as limited to a specific embodiment of the driver head 30. It should be understood that the driver head 30 may be any means for driving and/or rotating a fastener with a tool as known to one having ordinary skill in the art. Additionally, as shown in FIGS. 2 and 3, the threads 32 that may be located at the second end 24 of the composite fastener 12 may be received by and/or attached to the belly nut 16 as herein described below.

As shown in FIG. 7, the composite fastener 60 may be generally cylindrical in shape. The composite fastener 60 may have a first end 62 and a second end 64 that may be situated generally opposite to the first end 62. The composite fastener 60 may be constructed from the composite material between the first end 62 and the second end 64. In an embodiment, the composite fastener 60 may have threads 66 integrally formed with the composite fastener 60 between the first end 62 and the second end 64.

In an embodiment, the threads 66 that may be located at the first end 62 of the composite fastener 60 may receive a tip 68. The tip 68 may be internally threaded, and/or the threads 66 may receive the tip 38 by rotating the tip 68 onto the threads 66. In an embodiment, the tip 68 may be, for example, a screw cap to cap the first end 62 of the composite fastener 60. While the composite fastener 60 may be constructed entirely from the composite material, the tip 68 may be constructed from any material, such as for example, a carbon steel, a stainless steel, a zinc, the composite material and/or like material. The tip 68 may be configured in a shape that may allow the tip 68, while attached to the composite fastener 60, to be drilled into the insulation 10, the barrier 8, the sheeting material 6 and/or the backup structure 4. The tip 68 may be, for example, a cutting means and/or a drilling means for securing the composite fastener 60 to the backup structure 4. The tip 68 may have a tensile strength to effectively transfer the uniaxial load to the composite fastener 60. The present invention should not be deemed as limited to a specific embodiment of the tip 68. It should be understood that the tip 68 may be any attachment means for modifying a fastener as known to one having ordinary skill in the art.

In an embodiment, the threads 66 that may be located at the second end 64 of the composite fastener 60 may receive a driver head 70. The driver head 70 may be, for example, a threaded cap for attachment to the threads 66. While the composite fastener 60 may be constructed entirely from the composite material, the driver head 70 may be constructed from any material, such as, for example, carbon steel, stainless steel, zamac alloy, the composite material and/or like material. The driver head 70 may be configured in a shape that may allow a tool to drive the composite fastener 60 into the backup by rotating the composite fastener 60. The present invention should not be deemed as limited to a specific embodiment of the driver head 70. It should be understood that the driver head 70 may be any means for driving and/or rotating a fastener with a tool as known to one having ordinary skill in the art.

In an embodiment, as shown in FIG. 8, the composite fastener 80 may have a receiving socket 82 that may be mated with a male member 86 of a tip 84. The receiving socket 82 may be sized to securely receive the male member 86 to prevent a rotation and/or a removal of the tip 84 from the composite fastener 80. The tip 84 and/or the male member 86 may be constructed from, for example, a material that may not be the composite material. However, the composite fastener 80 may be constructed from the composite material. The tip 84 may be any means for cutting and/or boring the composite fastener 80 into the backup structure 4. The composite fastener 80 may have threads 88 that may be integrally formed with the fastener 80. The threads 88 may secure the composite fastener 80 to the backup structure 4. The present invention should not be deemed as limited to a specific embodiment of the composite fastener 80, the tip 84, the male member 82 and/or the threads 88.

In an embodiment, as shown in FIG. 9, the composite fastener 100 may have threads 106 that may be integrally formed with the composite fastener 100 between a first end 108 and a second end 110 positioned generally opposite to the first end 108. The composite fastener 100 may be constructed from the composite material between the first end 108 and the second end 110. The threads 106 may receive a tip 102. The tip 102 may have a first end 112 and a second end 114 positioned generally opposite to the first end 112. The tip may be constructed from a material, such as, for example, stainless steal, carbon steal, zamac alloy and/or the like. The first end 112 of the tip 102 may be formed into a driver head 104. The second end 114 may have a drilling tip and/or threads for fastening the composite fastener to the backup structure 4. A fastening tool, such as, for example, a socket wrench and/or the like may be used to drive the tip 102 into the backup structure 4 by rotating the driver head 104. As a result the composite fastener 100 may be fastened to the backup structure 4 without applying a torque to the composite fastener 100 between the first end 108 and the second end 110 of the composite fastener. The present invention should not be deemed as limited to a specific embodiment of the composite fastener 100, the tip 102 and/or the driving head 104.

In an embodiment, the composite fastener 12, 60, 80, 92, 100 may be pre-fabricated as a part of the backup structure 4 and/or the wall 36 and, therefore, may not have the tips 28, 68, 84, 102 and/or the driver heads 30, 70, 104 for driving the fastener into the support structure 4 and/or the wall 36. It should be understood that the composite fastener 12, 60, 80, 92, 100 may be any fastener that may extend between the backup structure 4 and/or the wall 36 that may have a low k-value and/or non-corrosive properties as known to a person having ordinary skill in the art. The composite fastener 12, 60, 80, 92, 100 may reduce and/or retard thermal bridges and/or thermal shorts of heat through the insulation 10 and/or into and/or from the backup structure 4. Further, the composite fastener 12, 60, 80, 92, 100 may reduce an accumulation, a formation and/or a condensation of moisture at and/or near the support structure 4.

In an embodiment, FIGS. 1-6 generally illustrate the belly nut 16 which may be attached to the composite fastener 12, 60, 80, 92, 100. The belly nut 16 may receive the pintle 18 which may be attached to the wall 36. In an embodiment, as shown in FIGS. 3-5, the belly nut 16 may, for example, a shouldered nut that may have a shoulder height defined between a top end 40 and a bottom end 42 positioned generally opposite to the top end 40. The belly nut 16 may have a width defined between a first side 44 and a second side 46 positioned generally opposite to the first side 44. The belly nut 16 may have a threaded hole 48 to receive the composite fastener 12, 60, 80, 92, 100 that may extend from the first side 44 to the second side 46 of the belly nut 16. The threaded hole 48 may receive, for example, the threads 32, 66, 88 or 106 of the composite fasteners 12, 60, 80 or 100, respectively. Further, the belly nut 16 may have one or more pathways 50 for receiving one or more legs 20 of the pintle 8. The pathways 50 may extend form the top end 40 to the bottom end 42 of the belly nut 16. In an embodiment, the pathways 50 may be cylindrical in shape.

In an embodiment, the pathways 50 may have a diameter sized to loosely receive the legs 20 of the pintle 18 to allow for a vertical movement and/or a vertical eccentricity of the pintle 18 and/or the pintle legs 20 with respect to the belly nut 16. The diameter size may allow the legs 20 of the pintle 18 to have differing vertical positions within the belly nut 16 depending on an attachment location of the pintle 18 to the wall 36. However, the shoulder height may be selected to prevent a rotation of the legs 20 towards and/or away from the backup structure 4 and/or the wall 36 despite the vertical positions of the legs 20 within the pathways 50. In any case, an orientation of the pathways 50 and/or the pintle 18 may prevent movement of the pintle 18 and, therefore, the wall 36 in a horizontal direction and/or a perpendicular direction to and/or away from the backup structure 4. However, the orientation of the pathways 50 and/or the pintle 18 may allow for the vertical eccentricity and/or the vertical movement of the pintle 18 and, therefore, the wall 36 in directions parallel to the backup structure 4 without allowing horizontal deflections of the pintle 18 and/or the wall 36. In an embodiment, as shown in FIGS. 3-5, the shoulder height of the belly nut 16 and, therefore, a length of the pathways 50 between the top end 40 and the bottom end 42 of the belly nut 16 may be greater than the width of the belly nut 16 between the first side 44 and the second side 46 of the belly nut 16. The present invention should not be deemed as limited to a specific embodiment of the pintle 18 and/or threaded hole 48. The pintle 18 and/or the threaded hole 48 may be any pintle 18 and/or means for attaching the composite fastener 12, 60, 80, 92 to the belly nut 16 as known to a person of ordinary skill in the art.

In an embodiment, as shown in FIG. 6, the belly nut 52 may be similar to the belly nut 16; however, the belly nut 52 may have an opening 54 between the top end 40 and the bottom end 42 of the belly nut 52. The opening 54 may allow the belly nut 52 to be constructed with less material. Despite having the opening 54, the belly nut 52 may resist rotation of the pintle 18 about the pathways 50 towards and/or away from the backup support 4. As a result, the belly nut 52 may allow for the vertical eccentricity of the pintle 18 without allowing the horizontal deflections of the pintle 18 and/or the wall 36 in much the same manner as the belly nut 16.

In an embodiment, the belly nut 16, 52 may by constructed from any material, such as, for example, stainless steel, carbon steal, zamac alloy, the composite material and/or the like that may be strong enough to securely attach the composite fastener 12, 60, 80, 92 between the wall 36 and the backup support 4. In an embodiment, the material may be selected based upon an application of the belly nut 16, 52. The present invention should not be deemed as limited to a specific embodiment of the material used to construct the belly nut 16, 52. The belly nut 16, 52 may be constructed from any material known to a person of ordinary skill in the art.

In an embodiment, as shown in FIG. 10, a system 90 may have the backup structure 4, the insulation 10 and/or one or more composite fasteners 92. The composite fasteners 92 may extend through the insulation 10 into the backup structure 4. The composite fasteners 92 may be any fastening means constructed from the composite material along a length of the fasteners 92. The composite fasteners 92 may be constructed from an amount of the composite material that may prevent and/or reduce the thermal bridges and/or the thermal shorts that may result in a reduction in eat transfer through the insulation 10 to and/or away from the backup structure 4. The composite fasteners 92 may be, for example, anchor portions of a masonry veneer tie system. The composite fasteners 92 may be, for example, anchor portions having an eye and/or a loop section for use in masonry wire reinforcement systems that may be installed in the backup structure 4 that may be, for example, a block wall and/or a CMU. The system 90 may have any number of the composite fasteners that may create a net reduction of heat transfer through an envelope of a building defined by one or more backup supports 4 that may have the insulation 10 and/or other components for reducing heat transfer across the backup structure 4. As a result of using the composite material in the composite fasteners 92, the building may be energy efficient. Further, components used in the building envelope of the building may be exposed to less moisture and may last longer. Further, the composite material in the composite fasteners 92 may resist corrosion due to moisture. The composite fasteners 92 may be constructed to resemble known fasteners used in building applications, such as, for example, masonry veneer walls, masonry cavity walls, roofing, waterproofing, exterior insulation and finish systems (EIFS), metal buildings and/or the like. The present invention should not be deemed as limited to a specific embodiment and/or application of the composite fasteners 92. The composite fasteners 92 may be any fasteners that may be constructed from the composite material as known to a person of ordinary skill in the art.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A fastener for reducing heat transfer through a building envelope, the fastener comprising:
   a shaft having a length defined between a first end and a second end positioned generally opposite to the first end wherein the shaft is generically cylindrical about a central axis wherein the shaft is constructed from a composite material wherein the composite material is a fiber reinforced polymer wherein the shaft has threads integrally formed with the shaft;
   a tip that is removably attached to the first end of the shaft, wherein the tip is attached within a receiving socket located within the first end of the shaft; and
   a driver head in communication with the tip and the shaft to rotate the tip and the shaft about the central axis, such that torque applied to the driver head to rotate the tip is not transferred through the shaft.

2. The fastener of claim 1 further comprising:
   a tapped hole at the first end of the shaft wherein the tapped hole is threaded and receives the tip.

3. The fastener of claim 1 wherein the driver head is integrally formed with the tip wherein the driver head receives the threads of the shaft to attach the shaft to the driver head and the tip.

4. The fastener of claim 1 wherein the fiber reinforced polymer is a fiberglass.

5. The fastener of claim 1 wherein the composite material has an k-value less than one (1.0) Wlm K.

6. The fastener of claim 1 wherein the tip is attached to the threads of the shaft at the first end of the shaft.

7. The fastener of claim 1 wherein the tip is constructed from one of stainless steel, carbon steel and zamac alloy.

8. The fastener of claim 1 further comprising: a cutting means on the tip.

9. The fastener of claim 1 further comprising: a nut attached to the threads at the second end of the shaft.

10. A fastener for reducing heat transfer through a building envelope, the fastener comprising:
    a cutting tip secured to a driver head; and
    a shaft made from a composite material having relatively low thermal conductivity, the shaft includes a first end and a second end, wherein at least a portion of the shaft is threaded, wherein the first end includes a receiving socket within which the cutting tip and driver head are secured, wherein torque applied to the driver head to rotate the cutting tip is not transferred through the shaft.

11. The fastener of claim 10 wherein the composite material has a k-value less than one (1.0) Wlm K.

* * * * *